United States Patent
Westbrook, Sr.

(10) Patent No.: US 9,022,322 B2
(45) Date of Patent: May 5, 2015

(54) REMOTELY-CONTROLLED EMERGENCY AERIAL VEHICLE

(71) Applicant: Curnell Melvin Westbrook, Sr., Richmond, VA (US)

(72) Inventor: Curnell Melvin Westbrook, Sr., Richmond, VA (US)

(*) Notice: Subject to any disclaimer, the term of this patent is extended or adjusted under 35 U.S.C. 154(b) by 473 days.

(21) Appl. No.: 13/852,724

(22) Filed: Mar. 28, 2013

(65) Prior Publication Data

US 2014/0353422 A1 Dec. 4, 2014

Related U.S. Application Data

(60) Provisional application No. 61/788,065, filed on Mar. 15, 2013.

(51) Int. Cl.
| | | |
|---|---|---|
| *B64D 1/08* | (2006.01) | |
| *B64C 39/02* | (2006.01) | |
| *B64C 27/82* | (2006.01) | |
| *B64D 47/08* | (2006.01) | |
| *B64D 9/00* | (2006.01) | |
| *B64D 45/00* | (2006.01) | |
| *B64D 7/00* | (2006.01) | |

(52) U.S. Cl.
CPC ............... *B64C 39/024* (2013.01); *B64C 27/82* (2013.01); *B64D 47/08* (2013.01); *B64D 9/00* (2013.01); *B64D 45/00* (2013.01); *B64D 7/00* (2013.01)

(58) Field of Classification Search
None
See application file for complete search history.

(56) References Cited

U.S. PATENT DOCUMENTS

| | | | | |
|---|---|---|---|---|
| 2,738,939 | A * | 3/1956 | Johnson | 244/137.2 |
| 3,036,315 | A * | 5/1962 | Karnow | 441/83 |
| 3,228,044 | A * | 1/1966 | Mattenson | 441/83 |
| 3,539,070 | A * | 11/1970 | Dunlea, Jr. | 220/8 |
| 3,934,847 | A * | 1/1976 | Bentivegna | 244/137.2 |
| 4,115,841 | A * | 9/1978 | Alexander | 362/44 |
| 4,138,077 | A * | 2/1979 | Okumura | 244/137.2 |
| 4,982,914 | A | 1/1991 | Eickmann | |
| 5,005,083 | A * | 4/1991 | Grage et al. | 348/588 |
| 5,020,742 | A * | 6/1991 | Haslim | 244/137.2 |
| 5,077,609 | A * | 12/1991 | Manelphe | 348/144 |
| 5,581,250 | A * | 12/1996 | Khvilivitzky | 340/961 |
| 6,231,005 | B1 | 5/2001 | Costes-Onera | |
| 7,385,528 | B2 | 6/2008 | Gomez | |
| 7,604,198 | B2 * | 10/2009 | Petersen | 244/17.23 |
| 7,693,617 | B2 * | 4/2010 | Dockter et al. | 701/3 |
| 7,762,776 | B2 | 7/2010 | Siegel | |
| 7,946,530 | B1 * | 5/2011 | Talmage, Jr. | 244/118.2 |
| 8,157,205 | B2 * | 4/2012 | McWhirk | 244/30 |
| 8,434,920 | B2 * | 5/2013 | Jones | 362/470 |
| 8,479,883 | B2 * | 7/2013 | Tkebuchava | 182/129 |
| 8,590,828 | B2 * | 11/2013 | Marcus | 244/17.23 |
| 8,908,573 | B1 * | 12/2014 | Wang et al. | 370/280 |
| 8,910,905 | B2 * | 12/2014 | DeVaul et al. | 244/63 |

(Continued)

*Primary Examiner* — Christopher P Ellis
*Assistant Examiner* — Medhat Badawi
(74) *Attorney, Agent, or Firm* — Andrew Rush; PCT Law Group (57) ABSTRACT

Devices, systems and methods for utilizing a remotely-controlled aerial vehicle for emergency situations are disclosed. In an aspect of the present disclosure, a remotely-controlled aerial vehicle consisting of a rotor with interchangeably attached blades, a camera, an antenna for transmitting data, and rescue equipment which may be used to assist an endangered person on location is disclosed. In another aspect, the aerial vehicle further comprises a light source to assist in the use of the device at night, a pressure gun to assist in the delivery of rope or other materials in mountain side situations, an explosive device dropping mechanism, and a cable hoist.

19 Claims, 10 Drawing Sheets

(56) References Cited

U.S. PATENT DOCUMENTS

| | | | |
|---|---|---|---|
| 8,931,730 B2 * | 1/2015 | Wang et al. | 244/17.17 |
| 2004/0007644 A1 * | 1/2004 | Phelps et al. | 244/17.11 |
| 2005/0040283 A1 | 2/2005 | Frazer | |
| 2006/0175429 A1 * | 8/2006 | Lanigan et al. | 239/171 |
| 2009/0146010 A1 * | 6/2009 | Cohen | 244/137.1 |
| 2011/0137498 A1 | 6/2011 | Suzuki | |
| 2012/0091259 A1 | 4/2012 | Morris | |
| 2013/0134254 A1 * | 5/2013 | Moore | 244/17.11 |
| 2013/0200207 A1 * | 8/2013 | Pongratz et al. | 244/2 |
| 2013/0327890 A1 * | 12/2013 | Lyons | 244/107 |
| 2014/0061376 A1 * | 3/2014 | Fisher et al. | 244/62 |
| 2014/0069666 A1 * | 3/2014 | Vetesnik | 169/53 |
| 2014/0111332 A1 * | 4/2014 | Przybylko et al. | 340/539.1 |
| 2014/0316608 A1 * | 10/2014 | Alber et al. | 701/2 |

* cited by examiner

REMOTELY-CONTROLLED EMERGENCY AERIAL VEHICLE

CROSS-REFERENCE TO RELATED APPLICATION

This application claims the benefit of U.S. Provisional Patent Application No. 61/788,065 filed Mar. 15, 2013, and entitled "Remotely-Controlled Aerial Device", which is incorporated herein by reference.

FIELD OF THE DISCLOSURE

The present disclosure generally relates to remotely-controlled aerial vehicles, and more particularly to systems and methods for utilizing remotely-controlled aerial vehicles in emergency situations.

BACKGROUND

Rescues are responsive operations that usually involve in the saving of lives or the prevention of injury following an incident or dangerous situation. Many different tools are used by trained first responders to allow them to help injured or endangered persons in ways that are as fast and safe as humanly possible. These tools generally include, but are not limited to, search and rescue vehicles such as EMS rescue vehicles, fire engines, helicopters, and police cars, search and rescue dogs, and hydraulic cutting and spreading tools such as the "jaws of life."

Unfortunately, there are circumstances where common rescue tools are not sufficient to perform the rescue in a sufficiently timely manner. In many instances, roadways may be blocked by trees or other fallen debris which make it difficult for the responder to arrive at the incident site in a timely manner. Such delays may result in unnecessarily aggravated injuries or possibly death of the injured person(s).

In other circumstances, the rescue site may be on the face of a mountain or in the ocean where the responders will be able to reach, but the circumstances will cause a delay in reaching the injured person.

In recent years, the military has increasingly relied on drones. Drones are remotely-controlled aerial vehicles which may perform surveillance and missile launches in a manner that does not unnecessarily risk the lives of our soldiers. There are no current drones adapted for emergency, rescue, or first-aid situations. A remotely-controlled aerial vehicle designed to assist in rescue by providing on-site assistance to the rescuers or endangered persons is needed.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing systems and methods for utilizing remotely-controlled aerial vehicles in emergency situations. The remotely-controlled aerial vehicle is sufficiently structured to allow an operator to perform the process of locating people and/or dangerous situations in a timely manner and provide on-site assistance to endangered persons without introducing the rescuers into unnecessary dangers. The remotely-controlled aerial vehicle is constructed of a lightweight, but durable, material such as, but not limited to carbon fiber or aluminum, and comprises equipment such as, but not limited to, a search light, a camera, a blade configuration, a rotor, a cable tow which comprises a cable and an attachment device, and any other equipment necessary to perform the task desired by the operator.

In an aspect, the blade configuration will be interchangeable depending on the amount of power needed and/or desired by the operator. The blade configuration may be attached to a rotary disk attached to the rotor which will be readily interchangeable. In another aspect, the blade configuration may be permanently attached to the rotor and the rotor itself would be the interchangeable portion of the remotely-controlled aerial vehicle.

In an aspect, the rotor would be a specialized rotor equipped with a spring collar to measure the weight being towed and/or lifted by the operator. The spring collar would send a signal to the operator, via a wireless signal to the control panel being used by the operator, indicating that remotely-controlled aerial vehicle is approaching the device's maximum weight load limit. The control panel can be located in a specialized trailer, but may be a hand held remote device.

In an aspect, the remotely-controlled aerial vehicle may be equipped with an explosive device dropping mechanism. The mechanism would be attached to the remotely-controlled aerial vehicle and would be designed to drop explosive devices to, for example, clear obstacles on a path, clear snow mounds on a mountain, scare sharks swimming too close to shore, or the like. The mechanism would be attached to the body of the remotely-controlled aerial vehicle and would be designed to hold one or more explosive devices capable of performing the necessary and/or desired task.

In an aspect, the remotely-controlled aerial vehicle would be accompanied by a specialized trailer. The specialized trailer would be designed to expedite the process by utilizing an electric motor system and a ramp designed with rollers which would assist with loading and unloading the device. The trailer would also be equipped with a control panel which will allow the operator to more efficiently operate the remotely-controlled aerial vehicle. The control panel will include a screen which will display the camera footage being captured by the remotely-controlled aerial vehicles on-board camera system.

In another aspect, the remotely-controlled aerial vehicle would consist of an attached pressure gun. The pressure gun would be capable of firing a bail of nylon to assist in rescue situations occurring on the face of a mountain which is not easily accessible. This deployment of excess nylon would ensure that rescue personnel are not unnecessarily exposed to more danger than necessary while performing life-saving rescues in dangerous situations.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed at systems and methods for utilizing a remotely-operated aerial vehicle in For the purposes of the foregoing disclosure, "endangered person" shall refer to an individual or individuals in need of assistance from first responders such as rescue teams, search parties, medical personnel, law enforcement, and the like. Endangered person includes, but is not limited to, individuals lost in the woods, children trapped by rushing water, individuals stranded due to flood waters, individuals caught in an avalanche, swimmers endangered by marine predators, and the like.

Figure 1:
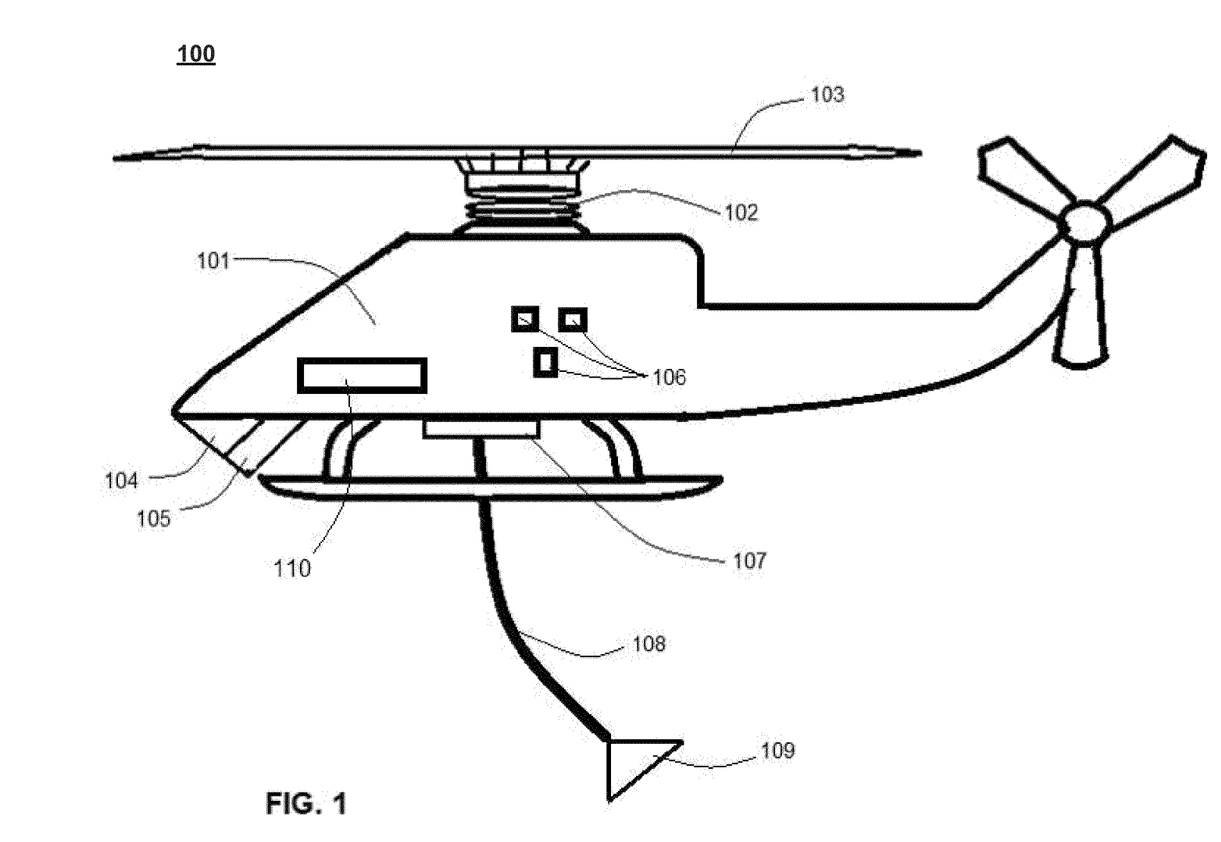
FIG. 1 is a side-view of a remotely-controlled emergency aerial vehicle, in accordance with an aspect of the present disclosure.

Referring to FIG. 1, a side view of a remotely-controlled aerial vehicle 100, in accordance with an aspect of the present disclosure, is shown.

Aerial vehicle 100 comprises a device body 101, a rotor 102 and a plurality of rescue equipment. Aerial vehicle 100 is configured to be remotely controlled by and operator and to provide assistance to endangered persons located in dangerous environments or situations. Remotely-controlled aerial vehicle 100 is supported by device body 101. Device body 101 provides one or more mounting points for other elements of aerial vehicle 100. Device body 101 may be constructed out of aluminum or carbon fiber. In another aspect, body 101 may be constructed out of materials that would be apparent to those having skill in the relevant art(s) after reading the disclosure herein. In an aspect, light source 104, camera 105, and cable hoist 107 are attached to device body 107. Light source 104, camera 105, and cable hoist may be removably connected to device body 101, thereby enabling elements to be removed or added to aerial vehicle 100, depending on the current mission of aerial vehicle 100.

Rotor 102 may be rotatably attached to device body 101 at a top portion of device body 101. Attached to rotor 102 are blades 103. Rotor 102 is driven via a motor (not shown in FIG. 1), driveshaft, or other power means configured to rotate rotor 102 and provide lift for aerial vehicle 100 via movement of attached blades 103. In an aspect, blades 103 are interchangeable between two, four, six, or more blades. Remotely-controlled aerial vehicle 100 may also be manufactured so that blades 103 are permanently affixed to rotor 102.

Camera 105 and/or light source 104 may be affixed to device body 101. Camera 105 may be any device capable of capturing image data such as still photographs, video footage, and the like. Light source 104 may be an incandescent light, one or more light emitting diodes (LED), a fluorescent light source, a halogen light source, or any other type of light source sufficient to satisfy the present disclosure. Light source 104 may be configured as a signal lamp, enabling aerial vehicle 100 to communicate with endangered persons. Light source 104 may be movably connected to device body 101 and used as a positionable search light.

Device body 101 may further comprise mechanism site 106. Mechanism site 106 may be utilized to attach various mechanisms such as, but not limited to, an explosive device dropping mechanism which can be used in situations including, but not limited to, dropping explosives on obstacles which block a necessary route to help clear a path for rescuers to reach an endangered person or to allow the endangered person to reach safety, dropping explosives on mounds of snow which block a necessary route to help clear a path, or dropping explosives in the water to scare away threatening ocean creatures (e.g., sharks).

Additional lights (not shown), grappling hooks, deployable floatation devices or other devices useful for assisting endangered persons may be attached to aerial vehicle 100 at mechanism site 106. In another aspect, mechanism site 106 comprises a first aid kit deployment device (not shown). The first aid kit deployment device contains one or more first aid kits and may drops the kits from aerial vehicle 100 to endangered persons after aerial vehicle 100 receives a command from an operator.

Cable hoist 107 may be attached to a bottom portion of device body 101. Cable hoist 107 may comprise a cable 108 having an attached handle 109. In another aspect, cable 108 comprises a rescue sling or gondola, configured to transport individuals or supplied via aerial vehicle 100.

In another aspect, any attachment sufficient to satisfy the present disclosure may be attached to cable 108 in a manner similar to handle 109, which includes, but is not limited to: (1) an audio detection device which would allow the operator to hear noises such as, but not limited to, screams for help, while performing searches; (2) a hook which would allow aerial vehicle 100 to transport equipment, such as life preservers, food and/or beverage rations, or the like to endangered persons; (3) a life raft which would allow the operator to assist a struggling swimmer out of the water by delivering the lift raft to the endangered person via aerial vehicle 100; (4) a basket which would allow aerial vehicle 100 to transport tools such as, shovels, hammers, nails, screwdrivers, screws, or the like; or (5) any other attachment as needed.

Pressure gun 110 may be statically attached, removably attached, or attached for movement to device body 101. Pressure gun 110 would allow aerial vehicle 100 to launch objects such as, but not limited to, balls of nylon or other rope to an endangered person, thereby providing a life line or guiding line to the endangered person.

Aerial vehicle may be powered by any appropriate power source including, but is not limited to, gas, battery, or any power source apparent to those having ordinary skill in the art after reading the description herein.

Figure 2A:
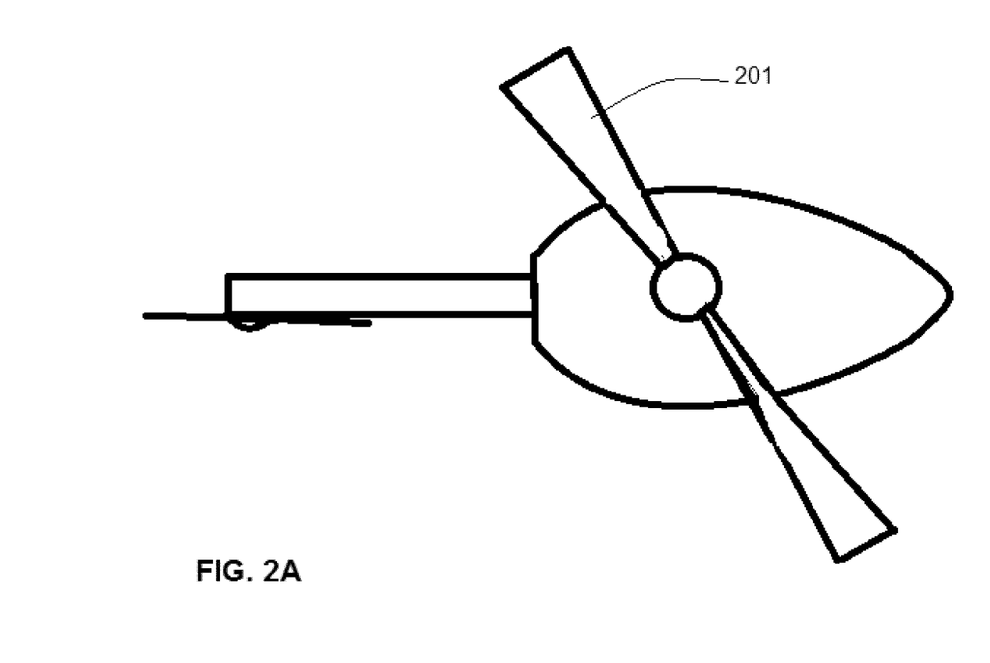
FIGS. 2A, 2B, and 2C are top views of an aerial vehicle, in accordance with an aspect of the present disclosure.
Figure 2B:
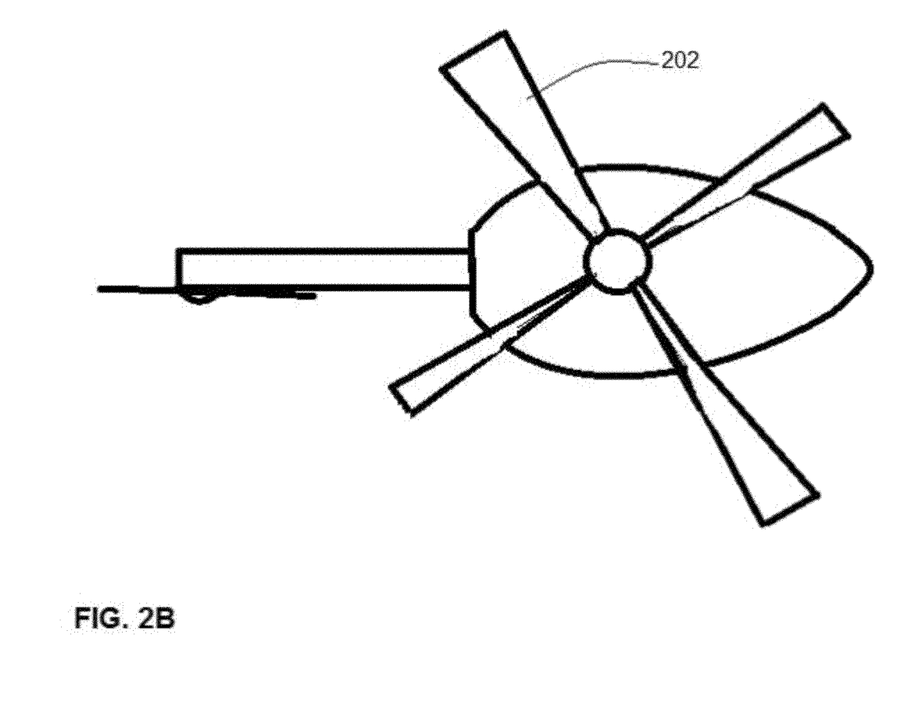
Figure 2C:
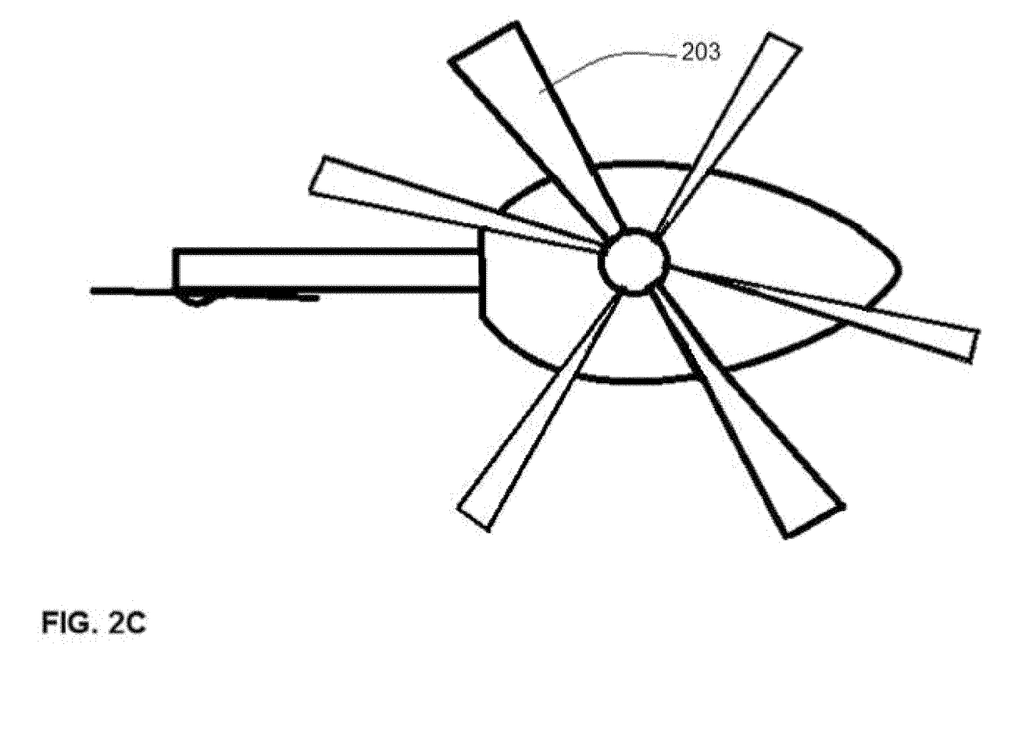

Referring to FIGS. 2A-C, aerial views for remotely-controlled aerial vehicle 100, in accordance with an aspect of the present disclosure, are shown.

In an aspect of the present disclosure, rotor 102 comprises a plurality of blades 103. The number of blades 103 attached to rotor 102 may be varied in order to provide increased lift, operational range, payload mass, and the like. In FIG. 2A, blade configuration 201 consists of two blades 103. In FIG. 2B, blade configuration 202 consists of four blades 103. In FIG. 2C, blade configuration 203 consists of six blades 103.

As will be apparent to those skilled in the relevant art(s) after reading the description herein, FIG. 2A, 2B, and 2C are not to be taken as limitation, but are merely exemplary. In an aspect, the number of blades 103 can be permanently affixed to rotor 102 and rotor 102 can be either itself entirely interchangeable or, alternatively, permanently affixed to device body 101. Further, the number of blades 103 can be set up in other denominations such as three, five, six, seven, eight, or any denomination sufficient to satisfy the present disclosure.

Figure 3:
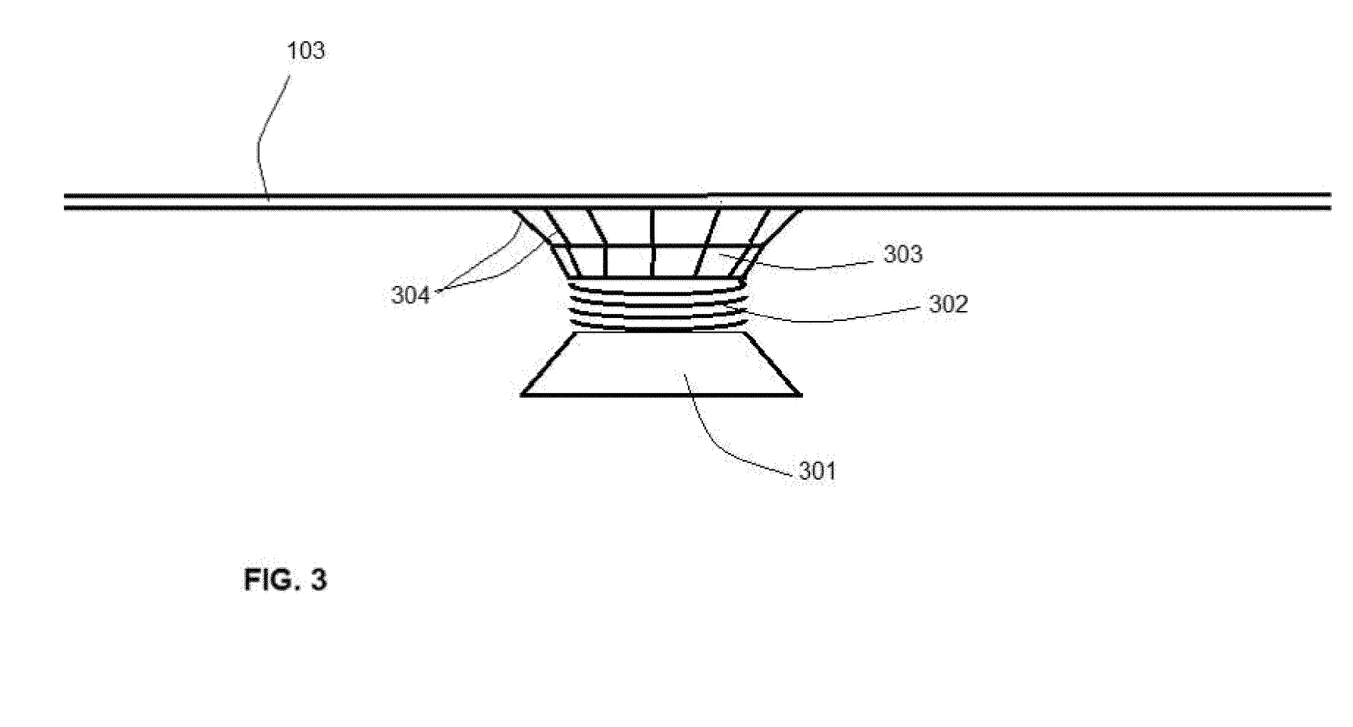
FIG. 3 is a side view of a rotor, in accordance with an aspect of the present disclosure.

Referring to FIG. 3, a side-view of rotor 102, in accordance with an aspect of the present disclosure, is shown.

Rotor 102 may be attached to device body 101 by affixing rotor base 301 to device body 101. Rotor base 301 may supports spring collar 302. Spring collar 302 is configured to measure the mass load being carried by remotely-controlled aerial vehicle 100. As the mass load approaches the maximum mass for aerial vehicle 100 in a given operational configuration, a warning signal may be sent to the operator. The signal will produce a response which will warn the operator that remotely-controlled aerial vehicle 100 is nearing its maximum capacity.

Attached to spring collar 302 is rotary cap 303. Rotary cap 303 may be removable or interchangeable in order to accommodate the number of blades 103 needed in a particular operational configuration. Rotary cap 303 may comprise spokes 304 configured to support and connect blades 103.

In an aspect, rotary cap 303 is permanently affixed to rotor 102. Rotor 102 may either be permanently affixed to device body 101 or the entirety of rotor 102 may be interchangeable by separating rotor 102 from device body 101 at rotor base 301. In such an aspect, the number of spokes 304 and the blade configuration determining the number of blades 103 would be predetermined and set upon manufacturing of rotor 102. In yet another aspect, both rotary cap 303 and rotor 102 may be interchangeable.

Figure 4:
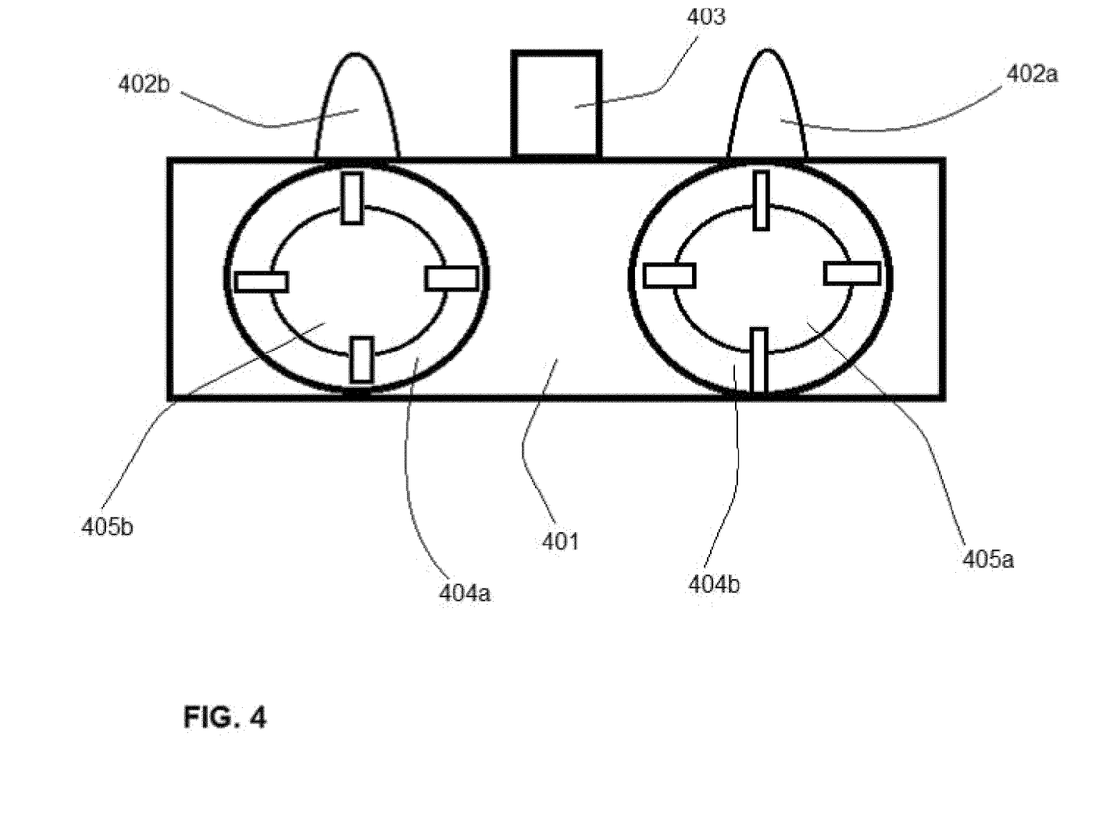
FIG. 4 is a top view of an explosive device dropping mechanism, in accordance with an aspect of the present disclosure.

Referring to FIG. 4, an aerial view of an explosive device dropping mechanism 400, in accordance with an aspect of the present disclosure, is shown. In an aspect, explosive device dropping mechanism 400 is attached to device body 101 at mechanism site 106 by hooks 402a and 402b and connection 403. Connection 403 connects explosive device dropping mechanism 400 to the electronic operating system of remotely-controlled aerial vehicle 100 thereby allowing the operator to send instructive signals to remotely-controlled aerial vehicle 100 for the operation of explosive device dropping mechanism 400. In such an aspect, explosive device dropping mechanism 400 may comprise recesses 404a and 404b which would house explosive devices 405a and 405b.

As will be apparent to those skilled in the relevant art(s) after reading the description herein, FIG. 4 is not to be taken as a limitation, but is merely exemplary. Hooks 402a and 402b and connection 403 may be any mechanism which will attach explosive device dropping mechanism 400 in a manner sufficient to satisfy the present disclosure. Further the number of recesses and explosive devices can be increased or decreased as needed and/or desired and explosive device dropping mechanism 400 can be modified to accommodate the increase or decrease in recesses and explosive devices. Further, explosive device dropping mechanism 400 can be designed for individually loaded explosive devices or may be designed to install "rounds" of explosive devices which would be moved into deployment position by a rotation system.

Figure 5:
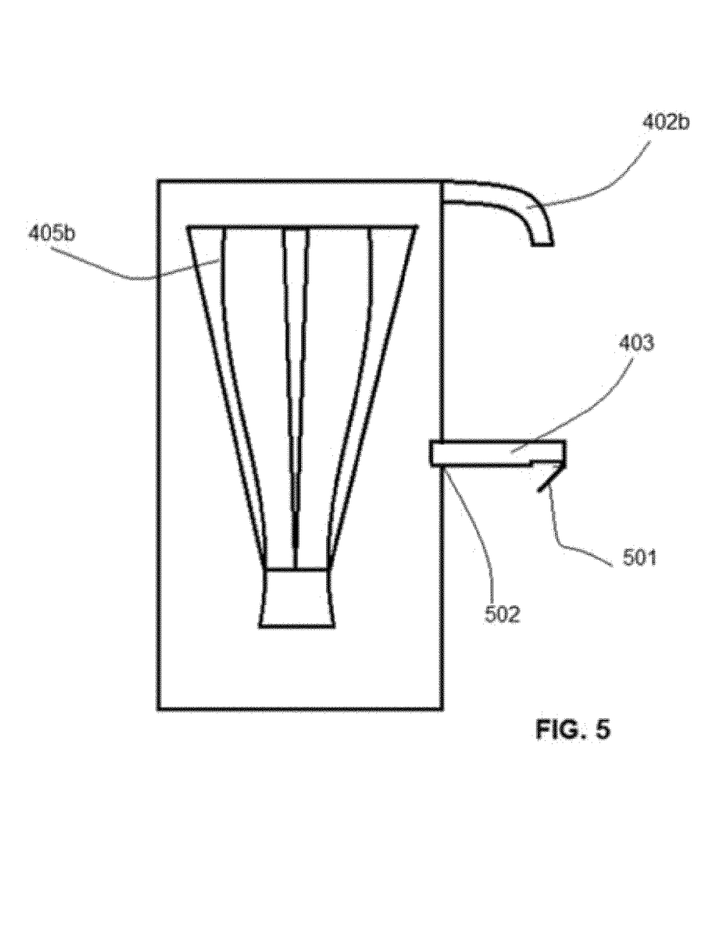
FIG. 5 is a side cross-sectional view of an explosive device dropping mechanism, in accordance with an aspect of the present disclosure.

Referring to FIG. 5, a side cross-sectional view of an explosive device dropping mechanism 400, in accordance with an aspect of the present disclosure, is shown. Explosive device dropping mechanism 400 stores explosive device 405 and is attached to device body 101 by hooks 402 and connection 403. In such an aspect, when connection 403 is fully inserted into device body 101, trigger 501 extends, "locking" explosive device dropping mechanism 400 into place.

Figure 6:
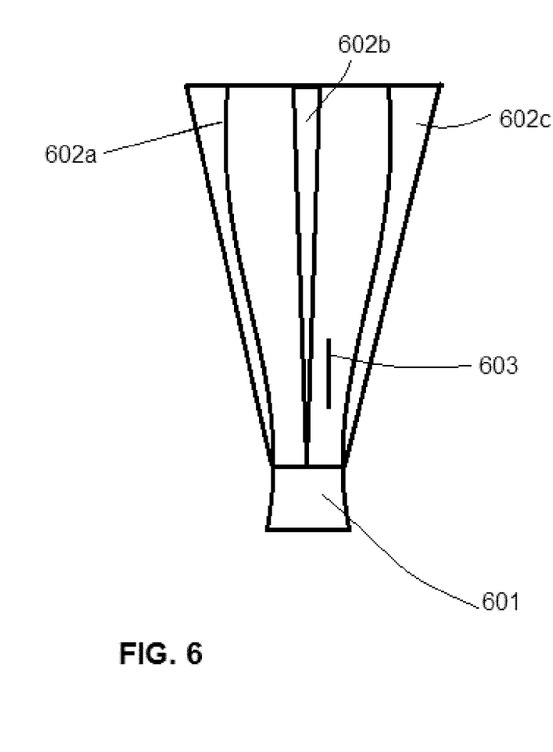
FIG. 6 is a side view of an explosive device to be utilized by the explosive device dropping mechanism, in accordance with an aspect of the present disclosure.

Referring to FIG. 6, a side view of an explosive device 405 to be utilized by the explosive device dropping mechanism 400, in accordance with an aspect of the present disclosure, is shown. In an aspect, explosive device 405b is comprised of nose 601, wings 602 (labeled, for clarity, as wing 602a-c in FIG. 6), and remote trigger 603. Nose 601 may be configured as a pressure trigger, causing explosive device 405 to detonate on impact with a hard surface. In another aspect, nose 601 may be aerodynamically shaped.

Wings 602 assist in the aerodynamics to ensure that explosive device 405 can be deployed accurately. Remote trigger 603 may be utilized to ensure proper detonation. In an aspect, component 603 is a wireless signal receiver which will be designed to receive a signal once explosive device 405 is a predetermined distance away from remotely-controlled aerial vehicle 100. In another aspect, remote trigger 603 is a timer which will cause the detonation of explosive device 405 to be triggered after a predetermined amount of time elapses.

Figure 7:
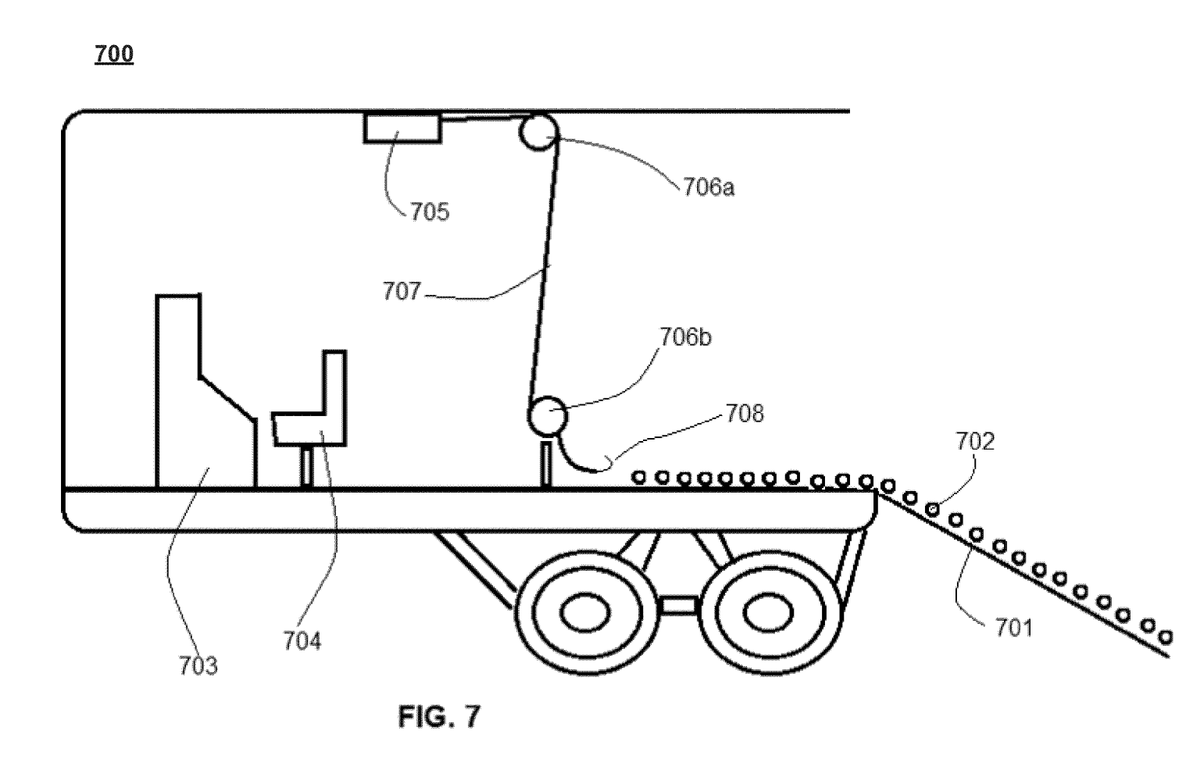
FIG. 7 is a side cross-sectional view of a specially designed trailer for use during the operation of a remotely-controlled aerial vehicle, in accordance with an aspect of the present disclosure.

Referring to FIG. 7, a side cross-sectional view of a specially designed trailer for use during the operation of a remotely-controlled aerial vehicle, in accordance with an aspect of the present disclosure, is shown.

An operator or aerial vehicle 100 may utilize trailer 700 in the deployment and operation of aerial vehicle 100. Trailer 700 may comprise ramp 701, rollers 702, control panel 703, operations chair 704, electric motor 705, pulleys 706 (labeled, for clarity, as pulleys 706a & b in FIG. 7), cable 707, and hook 708. Upon dispatch to an emergency location, trailer may be opened and aerial vehicle 100 accessed by lowering ramp 701. Utilizing rollers 702, the operator would unload remotely-controlled aerial vehicle 100 from trailer 700.

The operator would utilize control panel 703 and operations chair 704 to operate remotely-controlled aerial vehicle 100. Upon completion of the task, the operator would connect the remotely-controlled aerial vehicle 100 to trailer 700 utilizing hook 708. Operator will then activate electric motor which, using pulleys 706a and 706b and cable 707, will reload remotely-controlled aerial vehicle 100 onto trailer 700.

Ramp 701 can be designed to be opened manually or electronically. Further, the number and size of rollers 702 may be increased or decreased depending on operational requirements. Hook 708 is merely exemplary as a mechanism utilized to attach to remotely-controlled aerial vehicle 100 and can be replaced by any mechanism such as, but not limited to, a magnetic device or any device sufficient to satisfy the present disclosure, in accordance with an aspect of the present disclosure.

As will also be apparent to those skilled in the relevant art(s) after reading the description herein, control panel 703 may be configured for display on any computer system, such as a set-top box, desktop, a laptop, a server, a tablet computer, a PDA, a mobile telephone, a mobile computer, an intelligent communication device, or the like.

As will also be apparent to those skilled in the relevant art(s) after reading the description herein, in an aspect, remotely-controlled aerial vehicle 100 will not utilize trailer 700 and the operator would operate remotely-controlled aerial vehicle 100 utilizing a hand-held remote control device.

Figure 8:
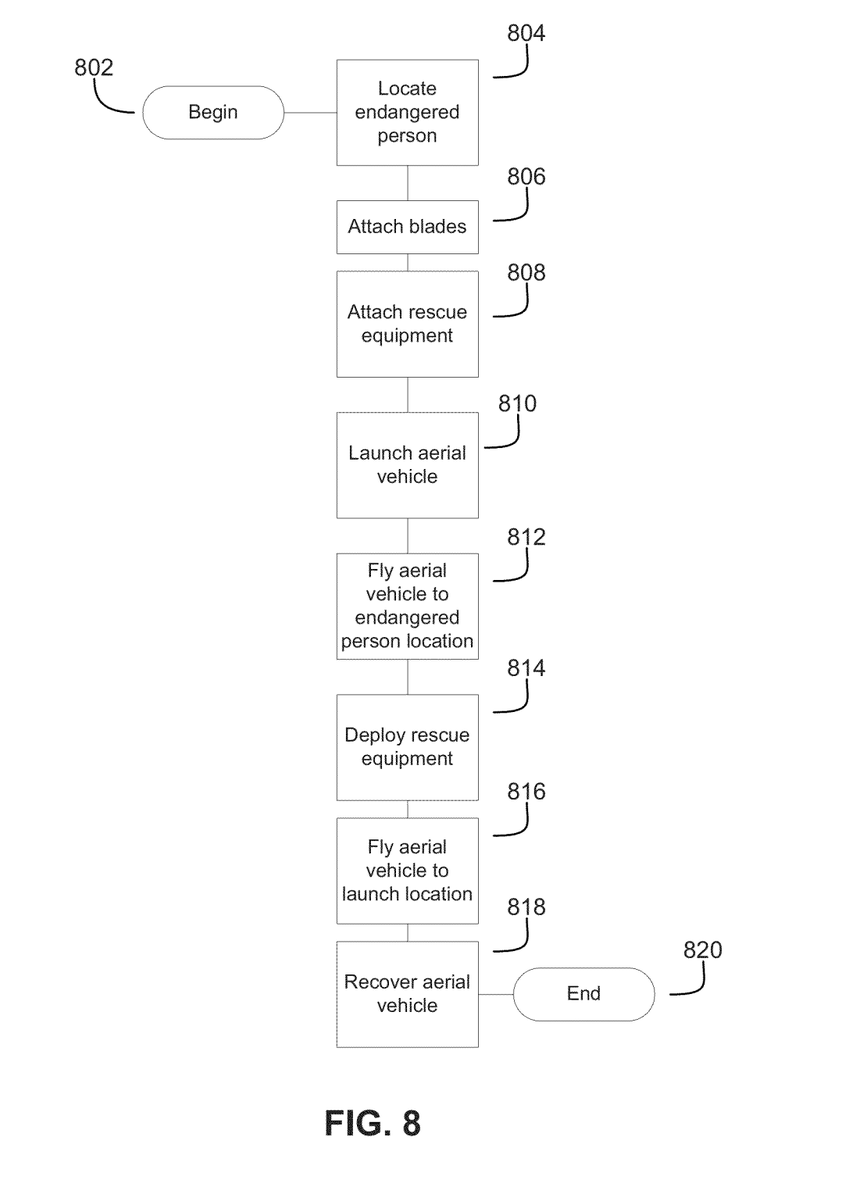
FIG. 8 is a block diagram of a process of operating a remotely-controlled aerial vehicle, in accordance with an aspect of the present disclosure.

Referring to FIG. 8, a block diagram of a process of operating a remotely-controlled aerial vehicle, in accordance with an aspect of the present disclosure, is shown. Process 800 begins at step 802 and proceeds immediately to step 804.

In step 804, an emergency situation arises and an operator of aerial vehicle 100 is made aware of the location of an endangered person. In some aspects, the operator is given the precise location of the endangered person. In other aspects, the operator is provided with a search area in which one or more endangered persons may be located.

In step 806, the operator attaches the appropriate blade configuration based on the information received about the emergency situation and the location of the endangered person.

In step 808, the operator attaches the appropriate equipment needed based on the emergency situation, aerial vehicle blade configuration, and environmental considerations, among other factors. In an aspect, the equipment may consist of handle 109 or a particular mechanism attached to mechanism site 106.

In step 810, aerial vehicle 100 is launched from a location enabling it to travel to the location of the endangered person and perform rescue operations. Aerial vehicle 100 may be transported to the launch area via trailer 700, and launched. In another aspect, aerial vehicle 100 is launched from an airfield, storage area, or similar location.

In step 812, the operator directs aerial vehicle 100 to fly to the location of the endangered person. Aerial vehicle 100 may be preprogrammed with transit instructions, enabling it to fly from the launch site to the location of the endangered person without operator guidance. In another aspect, aerial vehicle 100 may have wayfinding or auto pilot modules, thereby enabling autonomous, or semi-autonomous transit to the location of the endangered person.

In step 814, aerial vehicle 100 performs rescue operations by utilizing on board rescue equipment at the location of the endangered person.

In an aspect, where the operator comes across a situation where there is an obstruction of a path that needs to be cleared the operator sends a signal to aerial vehicle 100 to utilize explosive device dropping mechanism 400 with the instruction to drop an explosive device to clear the obstruction In an aspect where the operator comes across a situation where there is a need to provide assistance in rescue on a mountainous terrain, the operator sends a signal to remotely-controlled aerial vehicle 100 to utilize pressure gun 110 to, for example, deliver a bail of nylon rope so as to assist the emergency response team in scaling the mountainside with an injured victim.

In an aspect where the operator encounters a distressed swimmer, the operator may send a signal to aerial vehicle to deploy floatation devices. As will be apparent to those skilled in the relevant art(s) after reading the description herein, aerial vehicle 100 is sufficiently configurable to deploy and utilize a variety of rescue equipment in order to facilitate assisting the endangered person.

In step 816, aerial vehicle is flown back to launch location for recovery in step 818. Process 800 then terminates at step 820.

Figure 9:
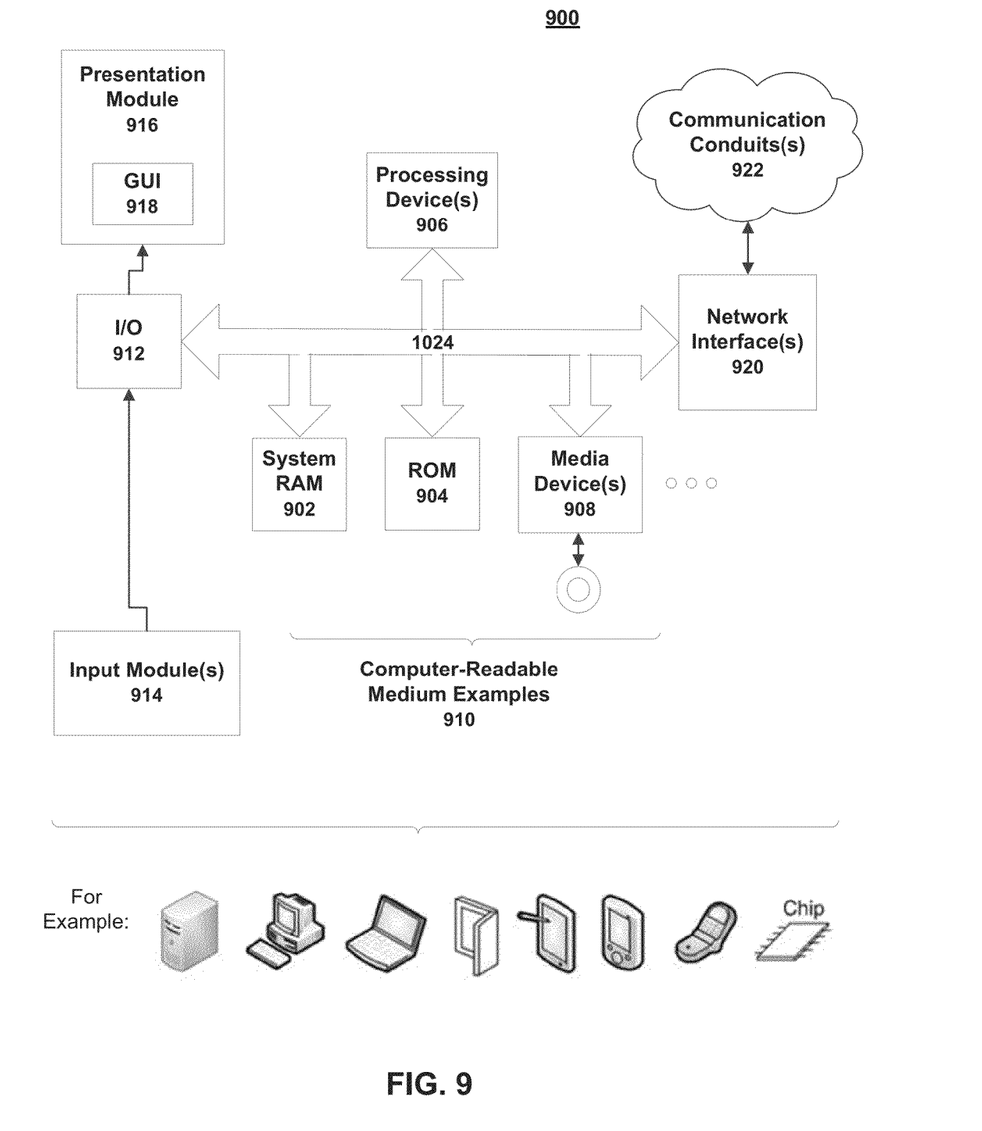
FIG. 9 is a block diagram illustrating an exemplary computer system useful for implementing an aspect of the present disclosure.

Referring to FIG. 9, a block diagram illustrating an exemplary computer system useful for implementing an aspect of the present disclosure, is shown. FIG. 9 sets forth an illustrative computer system that may be used to implement computing functionality 900, which in all cases represents one or more physical and tangible processing mechanisms.

Computing functionality 900 may comprise volatile and non-volatile memory, such as RAM 902 and ROM 904, as well as one or more processing devices 906 (e.g., one or more central processing units (CPUs), one or more graphical processing units (GPUs), and the like). Computing functionality 900 also optionally comprises various media devices 908, such as a hard disk module, an optical disk module, and so forth. Computing functionality 900 may perform various operations indentified above when the processing device(s) 906 execute(s) instructions that are maintained by memory (e.g. RAM 902, ROM 904, and the like).

More generally, instructions and other information may be stored on any computer readable medium 910, including, but not limited to, static memory storage devices, magnetic storage devices, and optical storage devices. The term "computer readable medium" also encompasses plural storage devices. In all cases, computer readable medium 910 represents some form of physical and tangible entity. By way of example, and not limitation, computer readable medium 910 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 902, ROM 904, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 900 may also comprise an input/output module 912 for receiving various inputs (via input modules 914), and for providing various outputs (via one or more output modules). One particular output module mechanism may be a presentation module 916 and an associated GUI 918. Computing functionality 900 may also include one or more network interfaces 920 for exchanging data with other devices via one or more communication conduits 922. In some embodiments, one or more communication buses 924 communicatively couple the above-described components together.

Communication conduit(s) 922 may be implemented in any manner (e.g., by a local area network, a wide area network (e.g., the Internet), and the like, or any combination thereof). Communication conduit(s) 922 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures. As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A remotely-controlled emergency aerial vehicle adapted for rescue operations, comprising:
   a main rotor having a plurality of removable blades and powered by a power source;
   a tail rotor;
   a device body housing the power source;
   a communications relay configured to send telemetry to a base station and receive instructions from the base station;
   a camera, attached to the device body, configured to relay visual data to the base station via the communications relay;
   a light source, attached to the device body, configured to provide a movable beam of light capable of illuminating terrain;
   a hoist, attached to the device body, the hoist movably connected to a cable and configured to raise and lower the cable during vehicle operation;
   a plurality of mechanism sites configured to removably connect the device body to assistance devices which facilitate assisting an endangered person when the aerial vehicle is at a rescue location, the rescue location being the approximate location of the endangered person; and
   a pressure gun, attached to the device body, capable of launching a guiding line from the vehicle;
   wherein the aerial vehicle is configured for remote control via the base station; and
   wherein the aerial vehicle is configured to assist the endangered person when the aerial vehicle is at the rescue location.

2. The aerial vehicle of claim 1, the cable further comprising:
   a handle configured for use by the endangered person;
   wherein the endangered person may be pulled by the aerial vehicle via the handle.

3. The aerial vehicle of claim 1, the cable further comprising:
   a sling configured for use by the endangered person;
   wherein the endangered person may be pulled by the aerial vehicle via the sling.

4. The aerial vehicle of claim 1, further comprising:
   an audio detection device configured to relay audio data to the base station via the communications relay.

5. The aerial vehicle of claim 4, wherein the audio detection device is attached to an end portion of the cable.

6. The aerial vehicle of claim 1, the cable further comprising:
   a hook configured to transport equipment.

7. The aerial vehicle of claim 1, further comprising:
   at least one explosive device; and
   an explosive device dropping mechanism attached to the device body at one of a plurality of mechanism sites, configured to house the at least one explosive device and release the at least one explosive device.

8. The aerial device of claim 7, wherein the at least one explosive device is configured to clear obstacles via detonation.

9. The aerial device of claim 7, wherein the at least one explosive device is configured to scare away marine animals via detonation.

10. The aerial device of claim 7, wherein the explosive device is released by the explosive device dropping mechanism in response to a signal received by the communications relay.

11. The aerial device of claim 7, the at least one explosive device comprising:
    a remote trigger configured to detonate the at least one explosive device in response to receiving a detonate signal from the aerial vehicle.

12. The aerial vehicle of claim 1, wherein the plurality of mechanism sites are configured to communicatively connect the aerial vehicle and the assistance devices.

13. The aerial vehicle of claim 1, wherein the assistance device comprises:
    a first aid kit;
    wherein the assistance device is configured to deliver the first aid kit to the endangered person.

14. The aerial vehicle of claim 1, wherein the assistance device comprises:
    a deployable floatation device;
    wherein the assistance device is configured to deliver the deployable floatation device to the endangered person.

15. The aerial vehicle of claim 1, wherein the assistance device comprises:
a plurality of life preservers;
wherein the assistance device is configured to deliver the plurality of life preservers to the endangered person.

16. The aerial vehicle of claim 1, the rotor comprising:
a spring collar configured to measure a mass load being carried by the aerial vehicle.

17. The aerial vehicle of claim 16, wherein the mass load is relayed to the base station via the communications relay.

18. The aerial vehicle of claim 17, wherein the base station is configured to generate an alert when the received mass load is greater than a mass load threshold.

19. A remotely-controlled emergency aerial vehicle system adapted for rescue operations, comprising:
An aerial vehicle comprising:
a main rotor having a plurality of removable blades and powered by a power source;
a tail rotor;
a device body housing the power source;
a first landing skid attached to the device body;
a second landing skid attached to the device body;
a communications relay configured to send telemetry to a base station and receive instructions from the base station;
a camera, attached to the device body, configured to relay visual data to the base station via the communications relay;
a light source, attached to the device body, configured to provide a movable beam of light capable of illuminating terrain;
a hoist, attached to the device body, the hoist movably connected to a cable and configured to raise and lower the cable during vehicle operation;
a plurality of mechanism sites configured to removably connect the device body to assistance devices which facilitate assisting an endangered person when the aerial vehicle is at a rescue location, the rescue location being the approximate location of the endangered person; and
a pressure gun, attached to the device body, capable of launching a guiding line from the vehicle; and
a trailer housing the base station and configured to transport and deploy the aerial vehicle;
wherein the aerial vehicle is configured for remote control via the base station; and
wherein the aerial vehicle is configured to assist the endangered person when the aerial vehicle is at the rescue location.

* * * * *